United States Patent [19]
Riley

[15] 3,662,632
[45] May 16, 1972

[54] RELATING TO MACHINE TOOLS

[72] Inventor: Raymond A. Riley, Bulkington, near Nuneaton, England

[73] Assignee: The Dunlop Company Limited, London, England

[22] Filed: May 14, 1969

[21] Appl. No.: 824,533

[30] Foreign Application Priority Data

| May 17, 1968 | Great Britain | 23,520/68 |
| Sept. 18, 1968 | Great Britain | 44,260/68 |
| Jan. 11, 1969 | Great Britain | 1,786/69 |

[52] U.S. Cl. ................................................. 82/36, 29/57
[51] Int. Cl. ................................................. B23b 29/20
[58] Field of Search ......................... 82/36; 29/57; 279/6

[56] References Cited

UNITED STATES PATENTS

| 2,697,611 | 12/1954 | Glasser | 279/6 |
| 2,708,583 | 5/1955 | Todd | 29/57 X |
| 2,785,902 | 3/1957 | Zajdel | 279/6 |
| 2,821,402 | 1/1958 | Schober | 279/6 |
| 2,833,544 | 5/1958 | Blades | 279/6 |
| 2,960,013 | 11/1960 | Novkov | 279/6 X |
| 3,402,625 | 9/1968 | Sweeney | 82/36 |

Primary Examiner—Leonidas Vlachos
Attorney—Ward, McElhannon, Brooks & Fitzpatrick

[57] ABSTRACT

In a machine-tool arranged to accept pre-set tools, a tool carrier on which the pre-set tools are detachably mounted. The tool carrier is arranged to be adjustably located on a tool support structure so as to permit alignment, and re-alignment after wear has taken place, of the carrier with the spindle axis of the machine-tool, of which the following is a specification.

2 Claims, 30 Drawing Figures

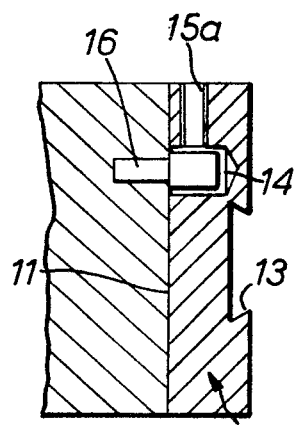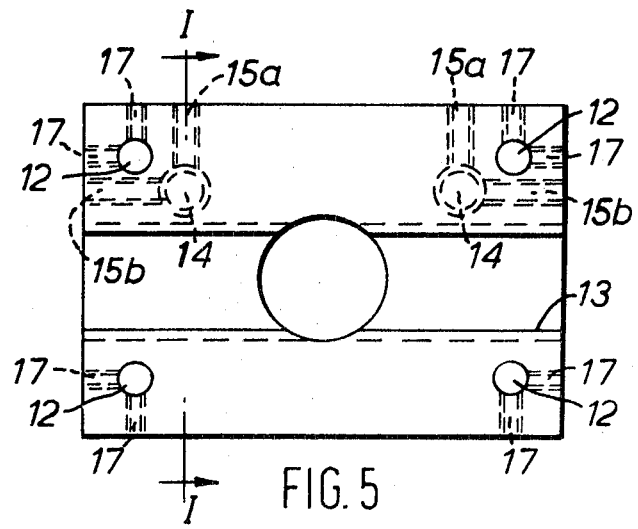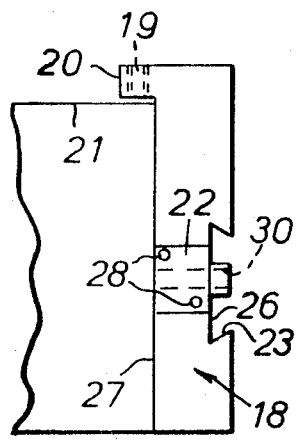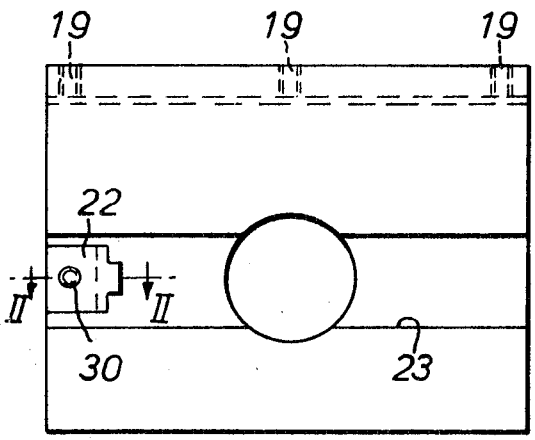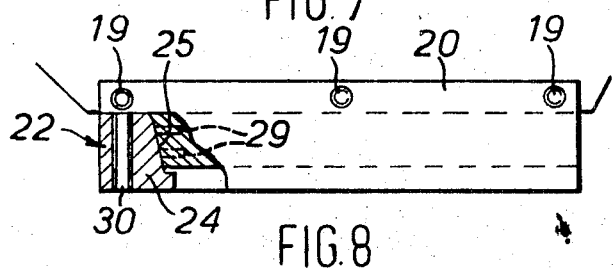

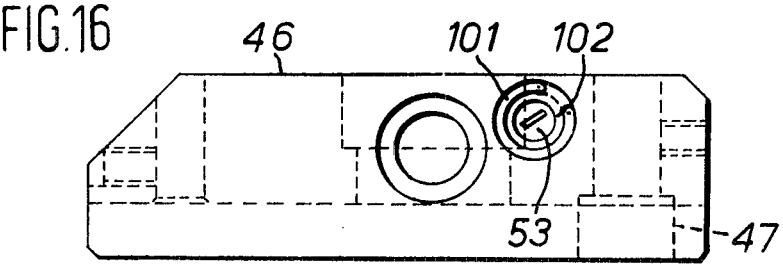
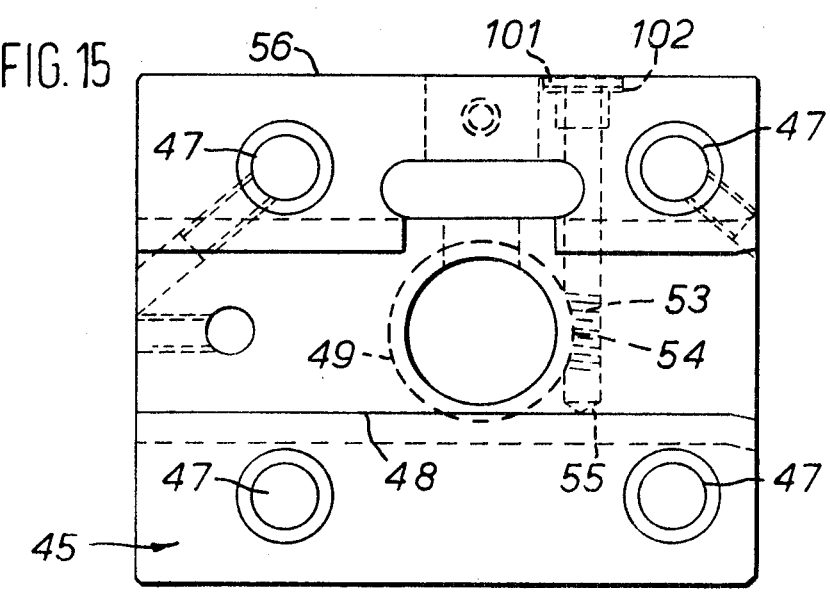
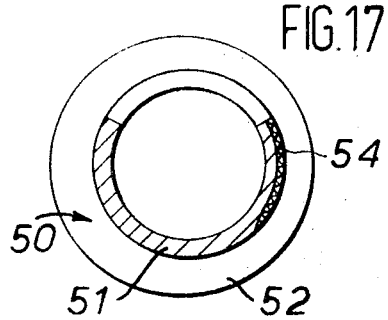
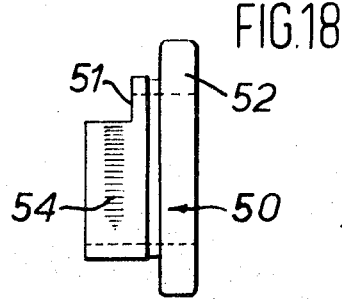

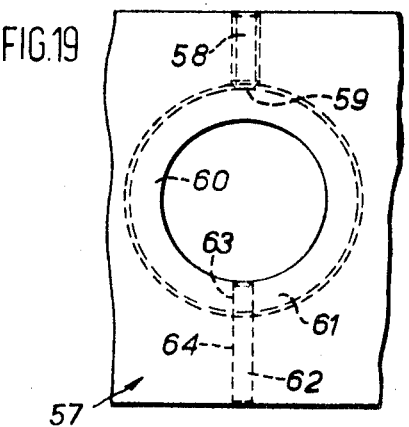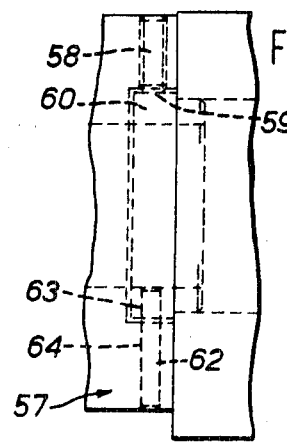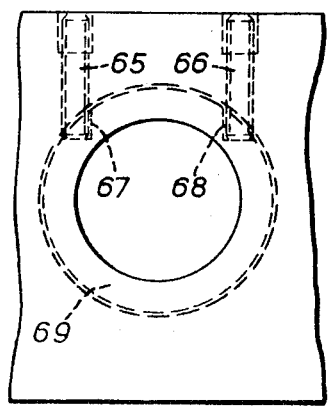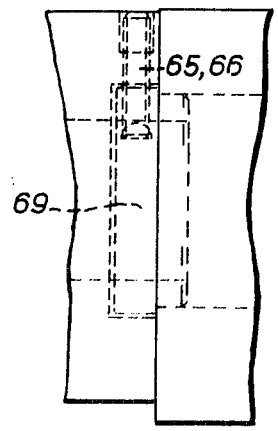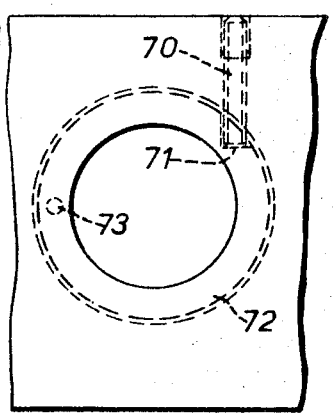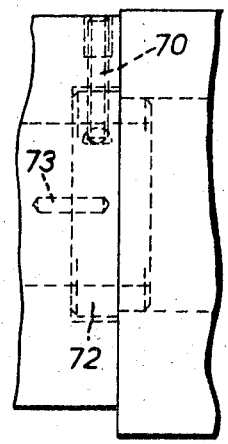

RELATING TO MACHINE TOOLS

This invention relates to machine-tools of the kind which is constructed and adapted for operation with a system of pre-set tooling, for example of the general kind described in U.K. Specification No. 921,602.

In a pre-set tooling system of the above kind the usual practice is to mount a cutting tool in a tool holder which is itself mounted on a tool holder member known, for example, as an "adaptor plate." The adaptor plate, which may alternatively be an integral part of the tool holder, is arranged to be detachably mounted on the machine-tool by a detachable connection to a corresponding carrier member or "changer plate" which is permanently secured in position on a tool support structure of the machine-tool.

The process of setting up a tool in the tool holder involves the removal of the adaptor plate carrying the tool holder to a location remote from the machine-tool and mounting the adaptor plate on a suitable pre-set jig corresponding to the changer plate and accurately positioned with reference to a datum, conveniently a surface plate. By this means the tool is adjusted in a position remote from the machine-tool and when the adaptor plate carrying the tool is subsequently replaced on the machine-tool, the tool will be in correct relationship with the spindle axis of the machine-tool, ready to commence operation without further adjustment.

However, the accuracy of this system, as applied to a capstan lathe, is dependent upon the preservation of accurate alignment with the spindle axis of the individual changer plates which are fitted at the respective turret stations, and it has been found that while a changer plate can be accurately fitted to an associated turret face upon initial conversion or manufacture of the machine-tool for pre-set operation, wear can occur in the turret indexing mechanism which may lead to lateral or vertical displacement of the axes of individual changer plates from the spindle axis when in the operative position. The normal method for aligning the changer plate with the spindle axis is first to bore and face the turret station from the machine spindle, and then to fit the changer plate permanently to the turret face with a spigot on the back of the changer plate registering in the turret bore to align the plate with the spindle axis. While the arrangement is satisfactory for initial setting up of the machine-tool it does not lend itself to easy adjustment of the alignment of the changer plate when wear occurs which leads to variations in the turret positioning.

One object of the present invention is to provide means for effecting realignment of a changer plate fitted to a machine-tool turret.

According to one aspect of the invention a tool carrier for a machine tool comprises locating means arranged to be adjustably engageable with a corresponding formation associated with a tool support structure in the machine-tool.

In one form of the invention a tool carrier for a machine-tool comprises locating means in the form of adjustment means associated with two spaced sockets arranged so that in the assembled state of the tool carrier on a machine-tool the sockets surround corresponding projections on the machine-tool with the adjustment means in adjustable engagement with the projections.

In another form of the invention, the tool carrier is arranged to have vertical adjustment means enabling it to be aligned in the vertical sense with the spindle axis, while means for adjustment in the horizontal sense takes the form of means for adjusting the horizontal position of a stop member which is carried on the carrier, the stop member being arranged so that in the assembled state of the carrier on the machine-tool the stop member engages an associated tool holder member to locate the tool holder member in a pre-set relationship, in the horizontal sense, relative to the machine-tool spindle axis.

According to another aspect of the invention a machine-tool comprises a tool carrier as defined above.

Several embodiments of the invention will now be described with reference to the accompanying drawings of which:

FIG. 4 is a sectional view on the line I—I of FIG. 5 of a tool carrier incorporating two adjustment sockets;

FIG. 5 is a front elevation of the tool carrier shown in FIG. 4;

FIG. 6 is a side elevation of a tool carrier incorporating a ledge extending over the upper surface of an associated turret face and also shows details of one kind of adjustable end stop;

FIG. 7 is a front elevation of the tool carrier shown in FIG. 6;

FIG. 8 is a plan view of the tool carrier shown in FIGS. 6 and 7, the end stop being sectioned on the line II—II of FIG. 7;

FIG. 15 is a front elevation of a tool carrier incorporating adjustment means in the form of a rotatable spigot;

FIG. 16 is a plan view of the tool carrier shown in FIG. 15;

FIGS. 17–28 show details of five alternative forms of fixed spigot arrangement;

A conventional turret lathe comprising a hexagonal turret A, associated tool carriers B,C,D, lathe bed E and cross-slide F is prepared to receive pre-set tools in tool holders in the manner described in our co-pending U.K. Pat. application No. 23,520/68.

Figure 1:
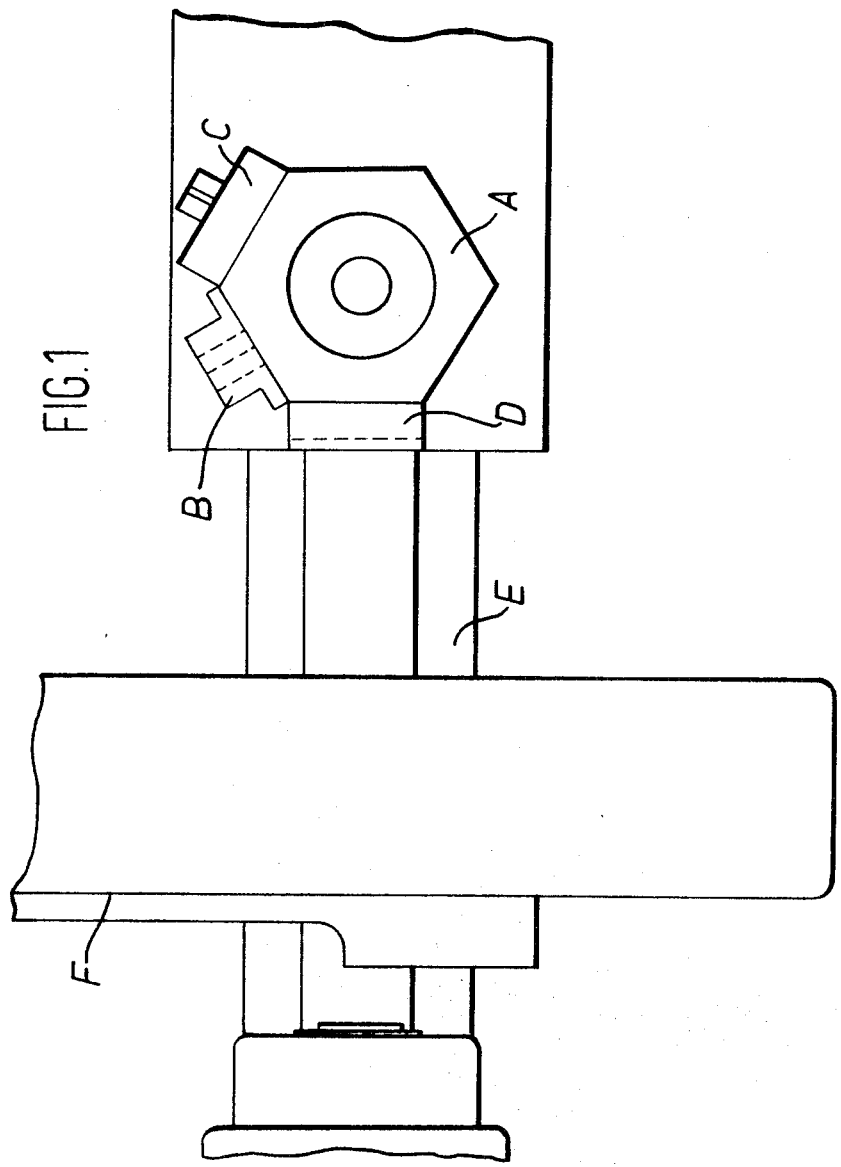
FIG. 1 is a diagrammatic arrangement showing the orientation in plan of tool carriers according to the present invention when employed on a turret lathe.
Figure 2:
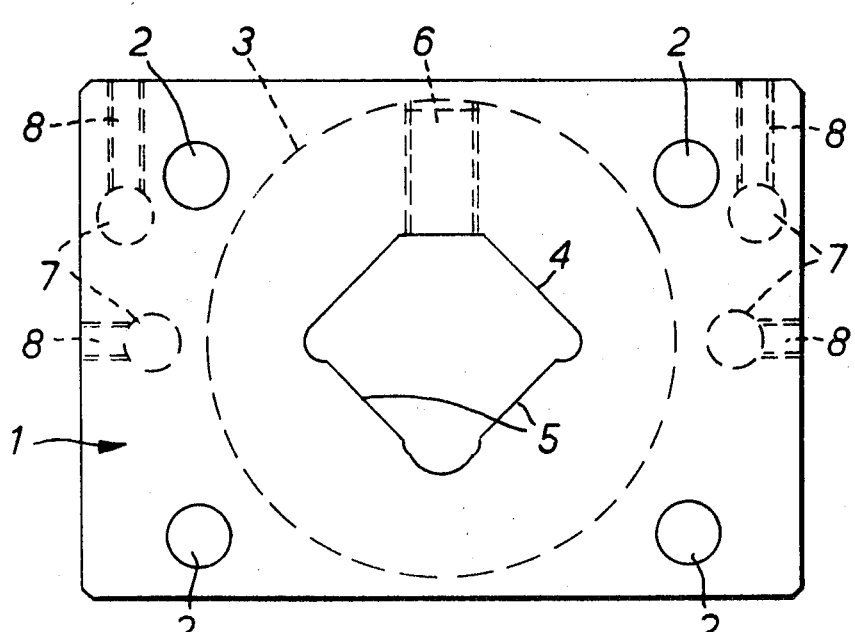
FIG. 2 is a rear elevation of a tool carrier incorporating four adjustment sockets.
Figure 3:
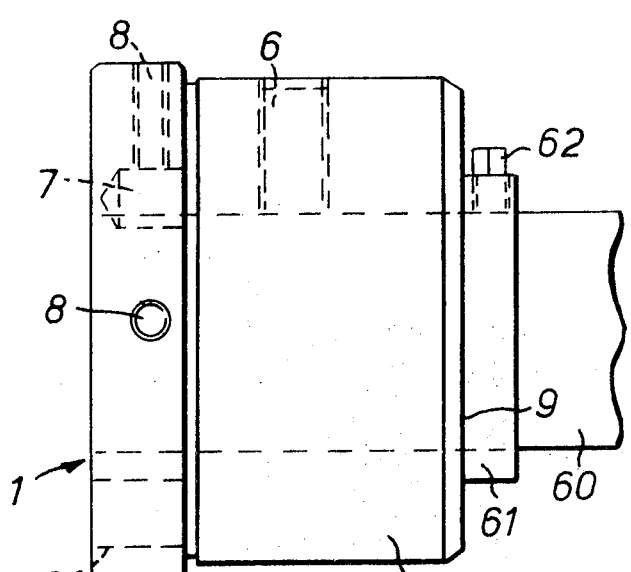
FIG. 3 is a side elevation of the tool carrier shown in FIG. 2.
Figure 9:
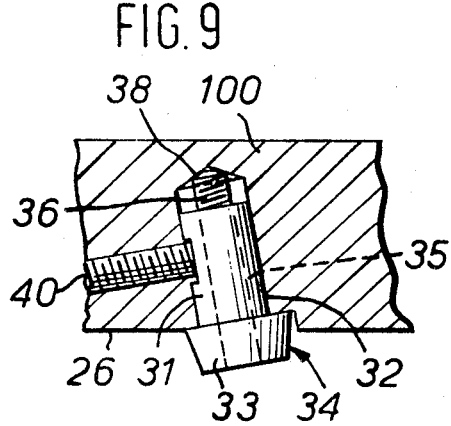
FIGS. 9–14 are sectional views of various forms of adjustable end stop.
Figure 10:
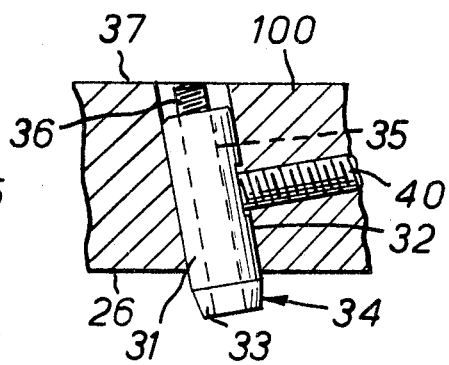
Figure 11:
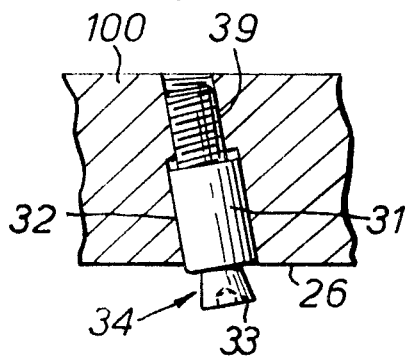
Figure 12:
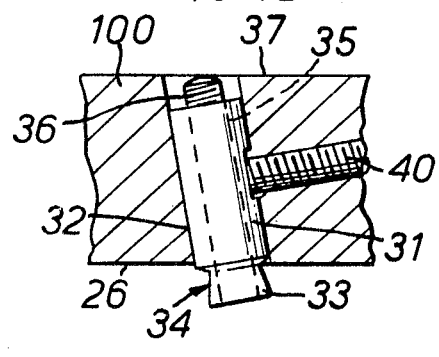
Figure 13:
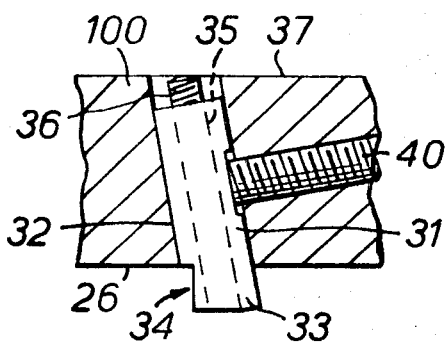

As illustrated in FIGS. 2 and 3 a tool carrier 1, in the form of a changer plate to which tool holders may be detachably secured, is arranged to be bolted to an associated turret face, as shown at B in FIG. 1, by four bolts passing through holes 2 positioned at the corners of the plate and comprises a central boss 3 arranged to extend at right angles to the turret spindle and having an aperture 4 formed therein, the axis of which is arranged to intersect the turret spindle axis at right angles. The aperture is approximately rectangular in form and is arranged with one diagonal vertical. The two lower sides of the aperture are machined to form accurate locating surfaces 5 for a tool holder 60 (part of which is shown only in FIG. 3) of corresponding shape to be inserted in the aperture, the angle between the two locating surfaces being formed with a radius so that when located in the aperture the tool holder rests with the two locating surfaces engaging corresponding seating surfaces on the tool holder and thus forming the omly regions of contact with the tool holder. The upper portion of the boss is bored and threaded to receive a vertically disposed clamping screw 6 which is engageable with the upper surface of the tool holder, the upper surface of the tool holder being arranged to enter the aperture with a substantial clearance from the upper sides thereof to enable the tool holder to be clamped in position in the aperture solely by the action of the clamping screw exerting downward pressure on the tool holder to force it into firm engagement with the locating surfaces formed in the aperture.

The changer plate is provided with four sockets, two on each side of the boss, which are arranged to fit over corresponding pegs, not shown, secured to the turret face, and screw-threaded holes 8 are arranged, leading into the respective sockets, to house adjustment screws, not shown, which are engageable with the pegs when the plate is mounted on the turret. One socket on each side is provided with a vertical adjustment screw leading from the upper edge of the plate into the socket and the other socket on each side is provided with a horizontal adjustment screw leading from the associated side edge of the plate into the socket. By adjustment of the four screws the adaptor plate can be adjusted in position and secured by means of the four bolts at its corners with the axis of the aperture aligned accurately in a known relationship to the spindle axis.

In another embodiment, shown in FIGS. 4 and 5, a changer plate 10 for a system of pre-set tooling applied to a turret lathe comprises a rectangular base portion arranged to be secured to the face 11 of an associated turret station by means of four screws (not shown) passing through holes 12 arranged one at each corner of the changer plate. The changer plate is formed with a groove 13 of dovetail cross-section for location of a correspondingly shaped tongue on an adaptor plate (not shown), on which a tool holder is mounted with one end of the tongue in engagement with an end stop (not shown) projecting into the groove. A cam mechanism (not shown) is mounted on the changer plate to enable the adaptor plate to be located in an accurately pre-set position on the changer plate in the manner described in the specification of U.K. Pat. No. 921,602.

In addition to the four holes formed in the corners of the changer plate to receive the attachment screws, the changer plate is also provided with two spaced apertures 14 adjacent the two upper corners of the plate considered in its position as mounted on the turret. The two apertures extend completely through the changer plate, and the plate is bored from its two side edges and its upper edge to provide tapped holes 15a, 15b leading into the two apertures, each aperture having one vertical tapped hole 15a and one horizontal tapped hole 15b leading into the aperture. Each tapped hole is provided with a grub screw (not shown) having a flat end which is arranged to enter the aperture.

The turret station face 11 is provided with a pair of dowel pegs 16 force-fitted into the turret in positions corresponding to the apertures in the changer plate and engageable by the screws.

In setting up and aligning the changer plate with the spindle axis, the four attachment screws are tightened sufficiently to hold the plate against the turret face but to permit a certain degree of lateral and vertical movement. The vertical position of the plate is then set by means of the vertically disposed adjustment screws, the adjustment being carried out to bring the dovetail groove on the changer plate into the correct relationship with the spindle axis in the vertical sense. The position of the changer plate in the horizontal direction relative to the spindle axis is then adjusted by means of the horizontal adjustment screws, and these screws are tightened so as to provide a substantial pre-load on the adjustment screws when the changer plate is in correct alignment with the spindle axis. The four attachment screws are then fully tightened.

In order to provide additional resistance to any tendency for the changer plate to be moved from its pre-set position during use, locking screws (not shown) may be provided for engagement with the four attachment screws described above. The locking screws may be contained in screw-threaded bores 17 in the changer plate so as to enter the holes 12 formed at the corners of the plate for the attachment screws, one vertical and one horizontal locking screw being provided for each attachment screw. The locking screws are tightened against the sides of the attachment screws after adjustment of the changer plate position, and thus prevent relative movement between the attachment screws and the sides of the clearance holes in the changer plate through which they pass.

In an alternative embodiment of the invention, shown in FIGS. 6, 7 and 8, the changer plate 18 is of similar general form to that of the plate described above, but instead of locating the plate on dowles fitted into the turret face, vertical adjustment screws (not shown) are provided in screw-threaded bores 19 contained in a ledge 20 which protrudes from the upper edge of the plate and extends over the upper edge of the turret face 21. The vertical adjustment screws engage the upper edge of the turret face to provide means for aligning the changer plate, in the vertical sense, with the spindle axis, and when this adjustment is complete the changer plate can be locked in position by means of attachment screws (not shown) as described above. Additional locking screws, also as described above, may be provided for the attachment screws.

The changer plate as a whole is not provided with means for adjustment in the horizontal sense: instead an adjustable end stop, generally designated 22, is mounted in the dovetail groove 23 of the changer plate for the accurate location, in the horizontal sense relative to the spindle axis, of an associated tool holder member in the form of an adaptor plate (not shown).

One form of adjustable end stop shown in FIGS. 6, 7 and 8 comprises a wedge-shaped block 24 mounted in a cutaway portion of the changer plate at one end of the dovetail groove and having an inclined face 25 which engages a corresponding face machined in the changer plate and extending from the base 26 of the dovetail groove 23 obliquely towards the rear face 27 of the plate. A pair of clamping screws (not shown) pass through clearance holes 28 in the block and engage screw-threaded holes 29 in the changer plate so that when the clamping screws are not fully tightened a fine adjustment of the horizontal position of the end stop can be obtained by sliding the block along the oblique face towards or away from the rear face of the changer plate. This movement may be controlled by means of an adjustment screw (not shown) aligned at right angles to the turret face and screw-threadedly engaged in a tapped hole 30 through the block, the end of the adjustment screw abutting the turret face so that rotation of the screw in the appropriate direction causes the block to ride up the oblique face on the changer plate and thus to adjust the horizontal position of the end stop.

Alternative forms of adjustable end stop shown in FIGS. 9–13 take the form of a cylindrical portion 31 in the form of a sleeve slidably located in a hole 32 formed in the base 26 of the dovetail groove and inclined at an angle of, say 10° to the perpendicular to the turret face. The sleeve is formed with a head 33 projecting into the groove to engage the adaptor plate (not shown), the head being of appropriate flared or tapering frusto-conical form or having a flat machined surface 34 so as to present a stop surface at right angles to the direction of the groove for engagement with the adaptor plate. The sleeve may have an axial screw-threaded bore 35, see FIGS. 9, 10, 12 and 13, to contain an adjustment screw 36 which abuts the turret face (not shown) on the line 37 to enable the sleeve to be moved axially in the inclined hole and thus to adjust the horizontal position of the stop surface, alternatively the adjustment screw may engage the end 38, see FIG. 9, of blind hole 32. In a further alternative, the adjustment screw may be integral with the cylindrical portion, see FIG. 11, and may engage a screw-threaded hole 39 in the changer plate 100 which forms a continuation of the inclined hole. In each case, a locking screw 40 or other locking device is provided for engagement with the cylindrical portion to prevent displacement thereof after adjustment has been effected.

Figure 14:
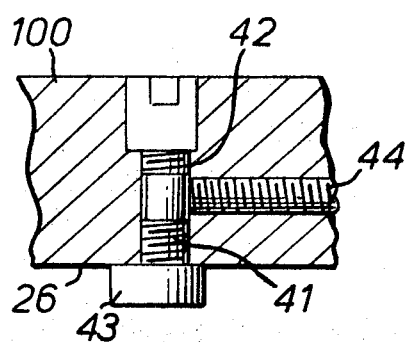

A further alternative form of adjustable end stop shown in FIG. 14 may consist of an adjustment screw 41 in screw-threaded engagement with a tapped hole 42 in the changer plate at right angles to the base 26 of the dovetail groove, the screw having a head 43 which projects into the groove to provide a stop surface and is of eccentric or cam-shaped form so that rotation of the screw provides horizontal adjustment of the stop surface. Alternatively a stop of this form may have a plain cylindrical shank instead of a screw thread, in either case a locking screw 44 is provided to prevent inadvertent rotation of the adjustment screw or stop.

In the embodiments described above permanent provision is made on the changer plate or on the associated turret face for vertical and horizontal adjustment of the changer plate or of an end stop carried thereon. However, in certain applications of the invention such adjustment may be carried out by means of apparatus which is partly or wholly detachable from the changer plate or mounting member. In one such application (not shown) a mounting member in the form of a knee turner bracket which is adapted for receiving pre-set tool holders is provided with vertical adjustment screws carried in a ledge which projects over the upper edge of an associated turret face, substantially as described above. Horizontal adjustment is obtained by means of horizontal adjustment screws carried in the mounting flange of the bracket and arranged to engage a bar which is temporarily clamped in position in the normal opening in the turret face. The necessity for a ledge which projects over the upper edge of the associated turret face can be eliminated by arranging a vertical adjustment screw, carried in the mounting flange of the bracket, to engage the upper surface of the bar. After adjustment has been carried out the mounting flange is secured tightly against the turret face by the usual attachment screws and the bar is removed. For greater security against disturbance of the bracket location locking screws as described above may be provided in the bracket mounting flange to engage the attachment screws.

In another embodiment of the invention shown in FIGS. 15, 16, 17 and 18 changer plate 45 for a system of pre-set tooling applied to a turret lathe comprises a rectangular base portion 46 arranged to be secured to the face of an associated turret station by means of four attachment screws (not shown) passing through holes arranged one at each corner of the changer plate. The changer plate is formed with a horizontal groove 48 of dovetail cross section for location of a correspondingly shaped tongue on an adaptor plate (not shown), on which a tool holder (also not shown) is mounted, so that one end of the tongue is engageable with an end stop (not shown) mounted on the changer plate and projecting into the groove. The end stop is arranged to be adjustable, for a purpose to be described. A cam mechanism (not shown) is mounted on the changer plate to enable the adaptor plate to be locked to the changer plate in the manner described in the specification of U.K. Pat. No. 921,602.

The changer plate is bored in a central position with respect to the four attachment screws to provide a housing 49 for a rotatable spigot 50, see FIGS. 17 and 18, mounted within the bore and projecting from the rear surface of the changer plate to engage a corresponding bore (not shown) formed in the turret station face. The spigot forms a cam member comprising two portions 51 and 52 which are eccentric with respect to one another, one portion 51 being located in the changer plate bore and the other portion 52 being arranged to be located in the turret face bore, the arrangement being such that each portion is a sliding fit within its respective bore. The spigot is arranged so that rotation of the spigot will cause the changer plate to be displaced relative to the turret in a plane parallel to the turret face, mainly in the vertical direction.

Means is provided for rotating the spigot, comprising an adjustment screw 53 located vertically in a plain blind bore of the changer plate and extending tangentially with respect to the portion of the spigot within the changer plate. The outer surface 54 of the associated portion of the spigot is formed with grooves constituting a screw thread engaged by the threads of the screw 53 to form a worm drive for rotating the spigot. The screw is held against movement along its own axis by abutment at one end with the end 55 of the blind bore in which it is contained, and at the other end by a circlip 101 and washer 102 which hold the head of the screw captive and flush with the upper surface 56 of the changer plate.

In order to set up and align the changer plate with the spindle axis, the four attachment screws are tightened sufficiently to hold the changer plate against the turret face but to permit a certain degree of lateral and vertical movement. The vertical position of the plate is then set by rotating the adjustment screw in the required direction to move the plate vertically into alignment with the spindle axis. The screw thread is arranged to be nonreversible to reduce the danger of disturbing the alignment accidentally. When adjustment has been effected the attachment screws are tightened to secure the changer plate to the turret face.

The action of rotating the spigot also displaces the changer plate to some extent in a horizontal direction and in order to align the axis of the changer plate with the spindle axis in the horizontal plane it is necessary for the end stop to be adjusted. Means for effecting this adjustment may conveniently comprise an arrangement of the kind described above.

While in the embodiment described above the vertical adjustment of the changer plate is effected by means of a rotatable spigot having two eccentric portions, in alternative embodiments now to be described a spigot is mounted with a clearance fit in the changer plate bore and a tight locating fit within the turret bore, the changer plate being provided with adjustment screws bearing on the spigot to enable the changer plate to be moved relatively to the spigot. The remaining constructional features of the changer plate are as described above.

In the first embodiment employing a fixed spigot, shown in FIGS. 19 and 20, the changer plate 57 comprises a single vertically aligned adjustment screw 58 bearing on the upper surface 59 of the spigot 60, and in the lower region 61 of the spigot a locating peg 62 is fitted in aligned bores 63, 64 formed respectively in the spigot and the changer plate and aligned with each other and with the axis of the adjustment screw. The locating peg is slidable in at least one of the aligned bores to permit relative vertical movement of the changer plate and the spigot to take place on rotation of the adjustment screw.

In the second embodiment employing a fixed spigot, shown in FIGS. 21 and 22, the arrangement is as described in the preceding paragraph, except that no locating peg is provided: two vertically aligned adjustment screws 65 and 66 are provided in the changer plate and are arranged to bear on cut-out shoulders 67, 68 formed in the upper surface of the spigot 69 and disposed symmetrically one on each side of the axis of the spigot as viewed in the axial direction.

Figure 25:
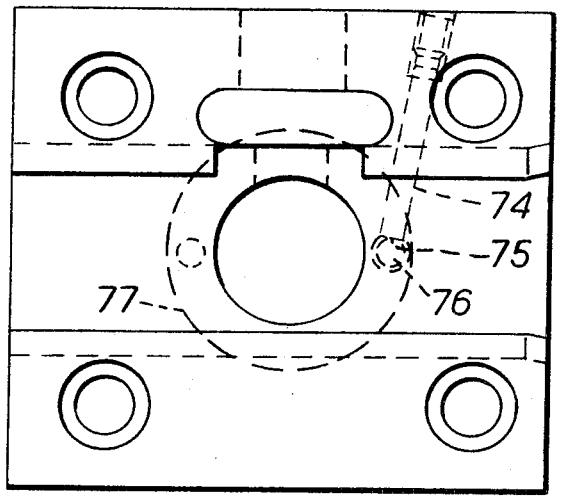
Figure 26:
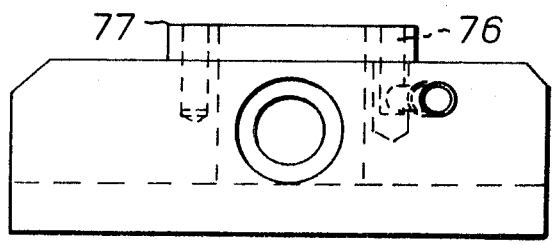

In the third embodiment employing a fixed spigot, shown in FIGS. 23 and 24, a single adjustment screw 70 is provided in the changer plate and arranged to engage a shoulder 71 formed on the spigot 72 as described in the preceding paragraph. The spigot is pivotally secured to the changer plate by a peg 73 extending parallel to the axis of the spigot in aligned bores in the changer plate and the spigot, the peg being positioned on the opposite side of the spigot relative to the adjustment screw. The screw does not necessarily need to be vertically disposed, and in a further variation of this embodiment, shown in FIGS. 25 and 26, the screw 14 may be arranged to bear on a flat surface 75 formed on a dowel peg 76 force-fitted into the spigot 77 and extending parallel to the axis thereof, instead of on a shoulder formed in the spigot.

Figure 27:
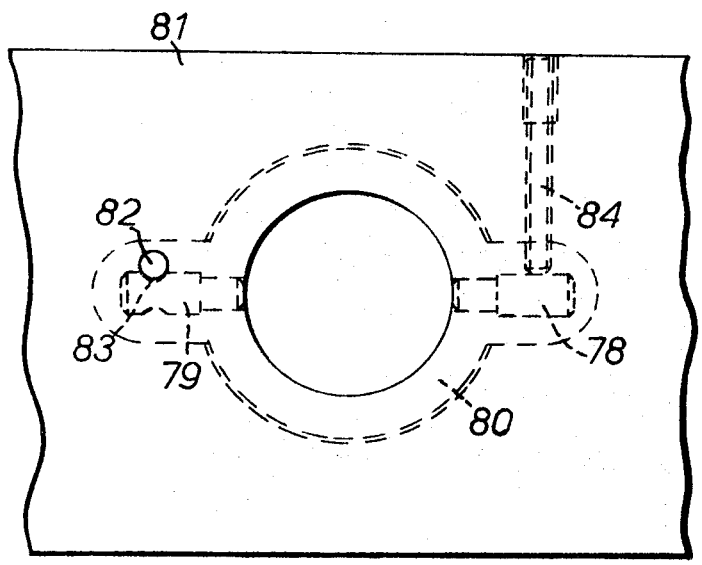
Figure 28:
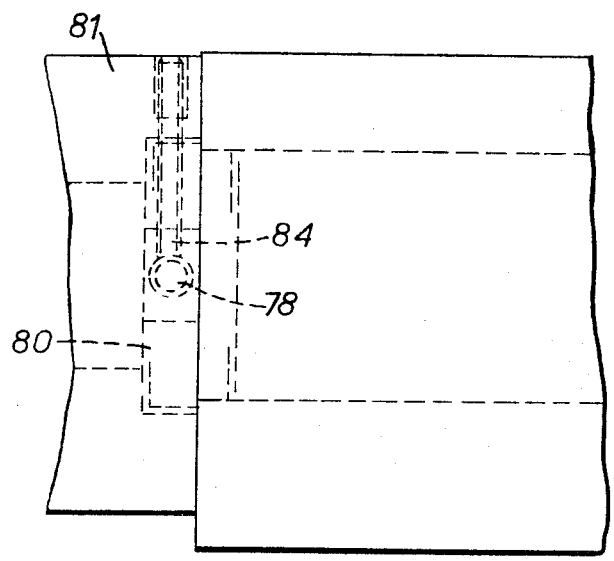

In the fourth embodiment employing a fixed spigot, shown in FIGS. 27 and 28, the spigot is provided with a pair of horizontally aligned dowel pegs 78, 79 extending radially outwardly one from each side of the spigot. One peg 79 is pivotally located on the changer plate 81 by a horizontal pin 82 fixed in the changer plate and extending at right angles to the peg to engage a neck 83 formed in the peg, and the other peg 78 is engaged by an adjustment screw 84 provided in the changer plate. The changer plate thus rests with the pin in engagement with the peg at one side of the spigot and the screw in engagement with the peg at the other side, and can be adjusted in height by rotation of the adjustment screw, causing the changer plate to swing about the pin as a pivot.

The changer plates described above have the advantage that they can be accurately aligned with the spindle axis by means of two simple adjustments which can be carried out with the changer plate in position on the turret and without any machining or fitting operations apart from rotation of the adjustment screws associated with the spigot and the end stop.

Although as described above the invention has been applied to changer plates for mounting on a lathe turret it will be realized that it also has many other applications.

Figure 29:
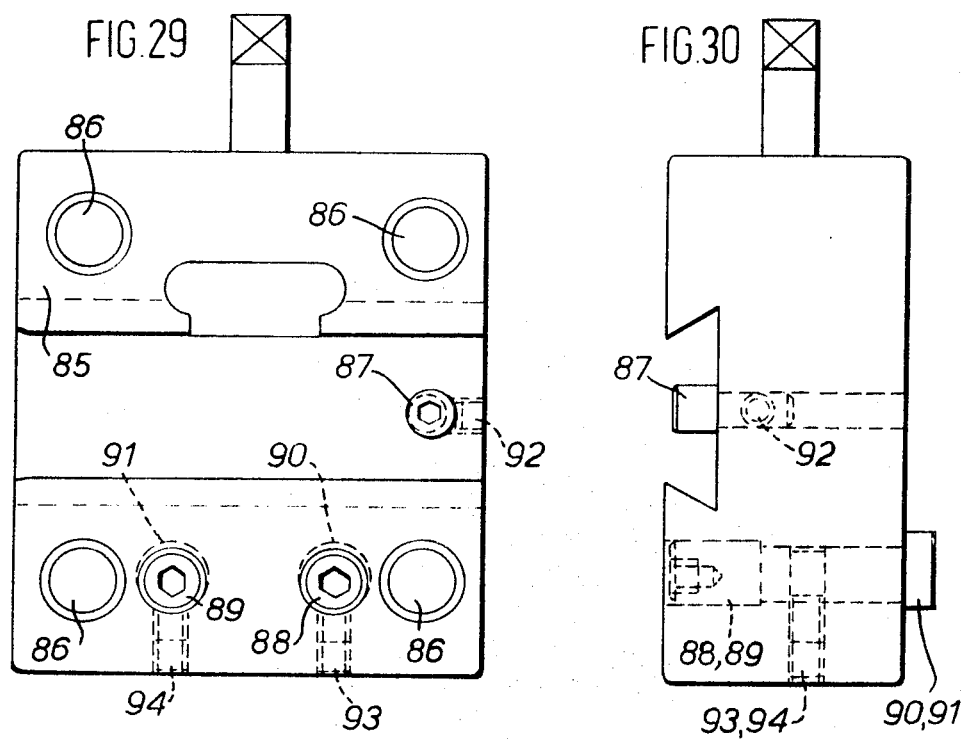
FIGS. 29 and 30 show front and side elevations respectively of a cross-slide tool carrier incorporating adjustment means in the form of eccentric cams.
Figure 30:
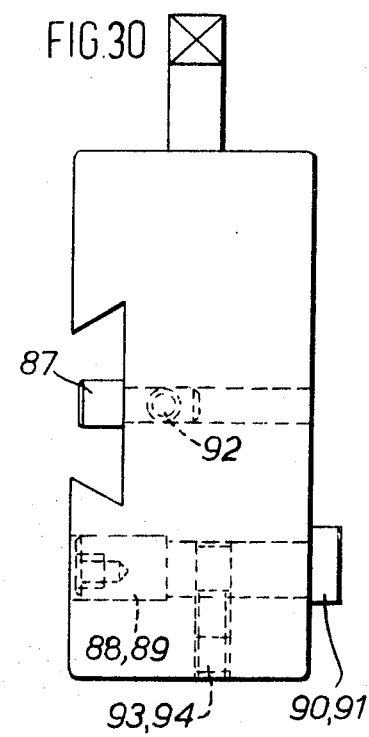

FIGS. 29 and 30 show an adjustable changer plate 85 for use on a lathe cross-slide (see F FIG. 1). The changer plate is attached to the cross-slide by "T" nuts (not shown) associated with fixing bolts (also not shown) passing through holes 86 arranged one at each corner of the changer plate. These "T" nuts engage two corresponding longitudinal "T" slots (again not shown) in the cross-slide. Longitudinal and transverse adjustment of the cross-slide changer plate is provided by means of an end stop 87 and two adjustment members 88, 89. The end of each adjustment member adjacent the cross-slide is provided with a head portion 90, 91 of eccentric or cam-shaped form. These two eccentric head portions are arranged to engage one wall of the upper flange portions of one of the "T" slots and by adjusting the relative angular position of the two eccentric head portions transverse adjustment of the changer plate is effected. An eccentric end stop 87 of the kind described above and shown in FIG. 14 is employed to provide the necessary longitudinal adjustment, both the end stop and eccentric adjustment members being provided with locking screws 92 and 93, 94 respectively to prevent displacement after adjustment has been effected.

A changer plate in accordance with the invention has the advantage that it is not only relatively simple to set up on initial conversion or manufacture of a machine-tool, but is also readily adapted for adjustment whenever it is found that as a result of wear in the machine-tool the pre-set tool positions are becoming inaccurate.

Having now described my invention, what I claim is:

1. A tool carrier for a machine-tool comprising locating means arranged to be adjustably engageable with a corresponding formation associated with a tool support structure in a machine-tool, said locating means comprising a spigot, mounted within a bore in the carrier, the spigot being arranged to be a clearance fit within the bore in the carrier and a tight locating fit within a corresponding bore in the tool support structure of the machine-tool, the carrier being provided with adjustment means engaging the spigot to enable the carrier to be moved in the vertical sense relative to the spigot, said adjustment means comprising a vertically aligned adjustment screw bearing on the upper surface of the spigot and a locating peg engaging the lower region of the spigot in the bore vertically aligned with the axis of the adjustment screw.

2. A tool carrier for a machine-tool comprising locating means arranged to be adjustably engageable with a corresponding formation associated with a tool support structure in a machine-tool, said locating means comprising a spigot, mounted within a bore in the carrier, the spigot being arranged to be a clearance fit within the bore in the carrier and a tight locating fit within a corresponding bore in the tool support structure of the machine-tool, the carrier being provided with adjustment means engaging the spigot to enable the carrier to be moved in the vertical sense relative to the spigot, said adjustment means comprising a pair of horizontally aligned pegs extending radially outwardly one from each side of the spigot, one peg being pivotally located within the carrier by means of a horizontal pin extending at right angles to the peg, and the other peg being engaged by an adjustment screw, vertical displacement of the adjustment screw causing pivotal movement of the carrier relative to the spigot.

* * * * *